(No Model.)
A. J. TAYLOR & M. A. HAMILTON.
Calf Weaner.
No. 240,284. Patented April 19, 1881.
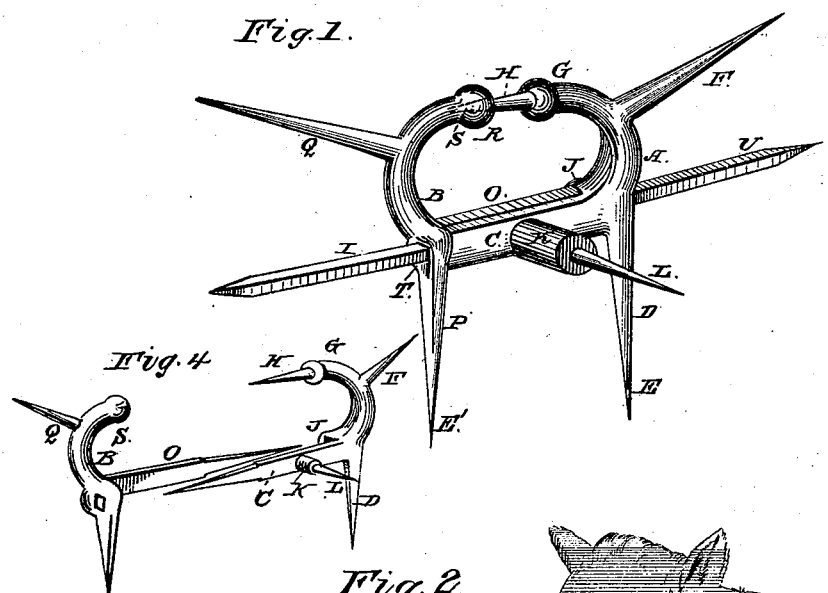
Fig. 1.
Fig. 4.
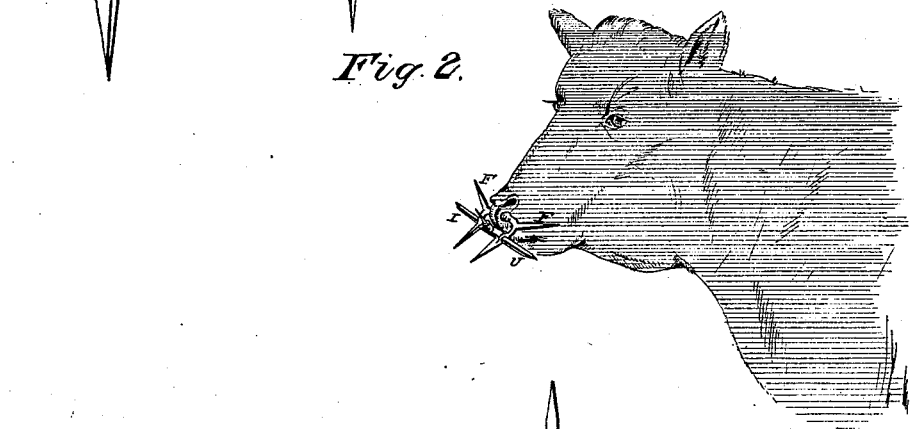
Fig. 2.
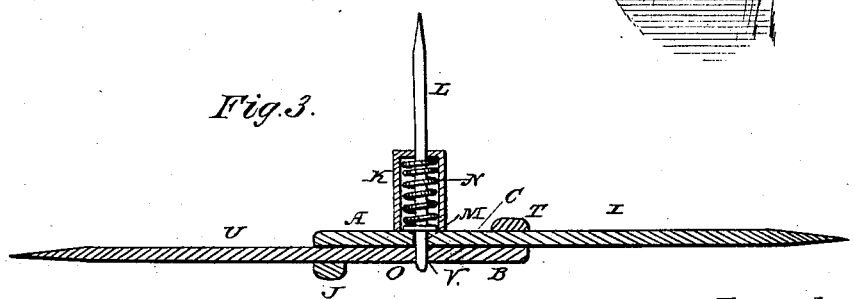
Fig. 3.
Witnesses:
Fred J. Dietrich
J. R. Littell
Inventors:
Andrew J. Taylor
Mild A. Hamilton,
by C. A. Snow & Co.
ATTORNEYS.

UNITED STATES PATENT OFFICE.

ANDREW J. TAYLOR AND MILO A. HAMILTON, OF FRANKFORT, KANSAS.

CALF-WEANER.

SPECIFICATION forming part of Letters Patent No. 240,284, dated April 19, 1881.

Application filed January 26, 1881. (No model.)

*To all whom it may concern:*

Be it known that we, ANDREW J. TAYLOR and MILO A. HAMILTON, of Frankfort, in the county of Marshall and State of Kansas, have invented certain new and useful Improvements in Calf-Weaners; and we do hereby declare that the following is a full, clear, and exact description of the invention, which will enable others skilled in the art to which it appertains to make and use the same, reference being had to the accompanying drawings, which form a part of this specification.

Figure 1 is a perspective view of our improved weaner, showing the same ready for insertion in the nose of the animal. Fig. 2 is a view showing the same in position in the nose of the animal. Fig. 3 is a sectional view taken through the sliding barbs and the fastening device, and Fig. 4 is a perspective view, showing the two parts separated or detached.

Corresponding parts in the several figures are denoted by like letters of reference.

This invention relates to calf-weaners; and it consists in certain improvements in the construction of the same, which will be hereinafter fully described with reference to the drawings, in which—

A B represent the two parts constituting the weaner.

The part A consists of a plate, C, upon the end of which is formed a barb, D, pointed at its lower end, as shown at E, and provided near its upper end with a diagonally-extending barb, F. The upper end of barb D is curved or bent in an inward direction, and terminates in a bulb or ball, G, from which a barbed prong, H, extends inward in a direction parallel to the plate C. The latter is provided with a square barb, I, and upon the under side of the said plate C, at or near its outer end, or directly under the barb D, is formed a loop or bail, J. Upon the front or outer side of plate C, at or near its center, is formed a box or chamber, K, forming a bearing for a latch-rod, L, barbed at its upper or outer end, and forced in a downward direction through a perforation, M, in plate C by the action of a suitably-arranged spring, N.

The part B of our improved weaner consists of a plate, O, provided at one end with a barb, P, pointed at its lower end, as shown at E', and provided near its upper end with a diagonally-extending barb, Q. The upper end of the rod P is curved in an inward direction, and provided at its extremity with a bulb, R, having a recess, S. Upon the upper side of plate O, near its outer end, or directly over the barb P, is formed a loop or bail, T, and the said plate O is provided with a square barb, U. A perforation, V, is formed at or near the center of plate O.

In operation the parts A B are placed together, as shown in the drawings, the barb I of the plate C passing through the loop T of plate O, and the barb U of the latter passing through the loop J of plate C. The blunt or inner end of the barbed latch-rod L then rests upon the face of the square barb U, and the said latch-rod is thus temporarily forced in an upward or outward direction. The barbed prong H is now held against the side of or just below the nose of the animal, and the parts A B pushed together until the barb H passes through the nose and enters the recess S of the ball or bulb R opposite. At the same time the latch-rod L reaches the opening V in plate O, into which it is forced by the action of the spring N, thus locking the device securely in position. To remove the weaner the latch-rod is drawn up or out of the perforation V and the parts A B separated sufficiently to enable the device to be removed.

Our improved calf-weaner is simple, durable, and easily attached or removed by those familiar with its construction; but the latch-rod, which also forms the principal barb, effectually prevents the device from being accidentally lost or detached.

Having thus described our invention, we claim and desire to secure by Letters Patent of the United States—

1. As an improvement in calf-weaners, the combination of two barbed plates, each having a bearing in which one of the barbs of the other may slide, and a suitable spring latch or fastening device, substantially as and for the purpose set forth.

2. As an improvement in calf-weaners, the combination of the plate C, provided with barbs D F, and bulb G, having prong H, loop J, and square barb I, with the plate O, provided with barbs, and a recessed bulb, R, square barb U and loop T, and a suitable spring latch or fastening device, substantially as and for the purpose set forth.

3. A calf-weaner provided with a barbed or pointed latch-rod, L, substantially as and for the purpose herein shown and specified.

4. The herein-described improved calf-weaner, consisting, essentially, of the sliding barbed parts A B, in combination with the barbed latch-rod L, and a spring, N, for operating the same, substantially as set forth.

In testimony that we claim the foregoing as our own we have hereto affixed our signatures in presence of two witnesses.

ANDREW J. TAYLOR.
MILO A. HAMILTON.

Witnesses:
W. T. DWINNELL,
F. B. TAYLOR, Jr.